(12) United States Patent
Pfaller et al.

(10) Patent No.: US 10,059,561 B2
(45) Date of Patent: Aug. 28, 2018

(54) FLOATING FEED ASSIST UNIT FOR THE PAYOFF OF BULK PACKAGED WELDING WIRE

(71) Applicant: ALCOTEC WIRE CORPORATION, Traverse City, MI (US)

(72) Inventors: Thomas Leo Pfaller, Traverse City, MI (US); Robert Allen Krause, Interlochen, MI (US)

(73) Assignee: ALCOTEC WIRE CORPORATION, Traverse City, MI (US)

( * ) Notice: Subject to any disclaimer, the term of this patent is extended or adjusted under 35 U.S.C. 154(b) by 0 days.

(21) Appl. No.: 15/501,621

(22) PCT Filed: Jul. 30, 2015

(86) PCT No.: PCT/US2015/042910
§ 371 (c)(1),
(2) Date: Feb. 3, 2017

(87) PCT Pub. No.: WO2016/022389
PCT Pub. Date: Feb. 11, 2016

(65) Prior Publication Data
US 2017/0233216 A1    Aug. 17, 2017

Related U.S. Application Data

(60) Provisional application No. 62/033,742, filed on Aug. 6, 2014.

(51) Int. Cl.
*B65H 57/20* (2006.01)
*B65H 57/18* (2006.01)
(Continued)

(52) U.S. Cl.
CPC ........... *B65H 57/20* (2013.01); *B23K 9/1333* (2013.01); *B65H 49/08* (2013.01); *B65H 57/18* (2013.01); *B65H 2701/36* (2013.01)

(58) Field of Classification Search
CPC ........ B65H 49/08; B65H 57/18; B65H 57/20; B65H 2701/36; B23K 9/1333
See application file for complete search history.

(56) References Cited

U.S. PATENT DOCUMENTS

| 1,804,996 A | 5/1931 | MacDonald |
| 2,319,828 A | 5/1943 | Rohweder |

(Continued)

FOREIGN PATENT DOCUMENTS

| DE | 202011108769 U1 | 1/2012 |
| EP | 1698421 A2 | 9/2006 |

(Continued)

OTHER PUBLICATIONS

Machine Translation of JP 2005-53649A, dated Mar. 3, 2005. (Year: 2005).*

(Continued)

*Primary Examiner* — William E Dondero
(74) *Attorney, Agent, or Firm* — Edell, Shapiro & Finnan, LLC

(57) ABSTRACT

A feed assist unit (1) includes a base portion (2) having a plurality of ribs (16*a-d*) on a lower surface (18) thereof. A dome portion (4) is connected to the base portion (2), and a rotating conduit portion (6) has a curved shape and is coupled to the dome portion (4). Each of the ribs (16*a-d*) has a first end (20) adjacent to the dome portion (4) and a second end (22) adjacent an associated side (14) of the base portion (2). The feed assist unit (1) has first and second central axes (A-A, B-B) oriented perpendicular to each other. First and third of the ribs (16*a*, 16*c*) are oriented parallel to the second central axis (B-B) and the second and fourth of the ribs (16*b*, 16*d*) can be oriented parallel to the first central axis (A-A). The first and third ribs (16*a*, 16*c*) are offset from the second central axis (B-B) by an offset length (OL) and the second (Continued)

and fourth ribs (16b, 16d) are offset from the first central axis (A-A) the offset length (OL).

20 Claims, 8 Drawing Sheets

(51) Int. Cl.
  *B23K 9/133* (2006.01)
  *B65H 49/08* (2006.01)

(56) References Cited

U.S. PATENT DOCUMENTS

| | | | |
|---|---|---|---|
| 3,618,873 | A | 11/1971 | Fons et al. |
| 3,815,844 | A | 6/1974 | Wright et al. |
| 4,253,624 | A | 3/1981 | Colbert |
| 4,657,204 | A | 4/1987 | Colbert |
| 5,634,604 | A | 6/1997 | Cooper |
| 5,657,935 | A | 8/1997 | Cooper |
| 5,911,381 | A | 6/1999 | Wacinski |
| 6,242,711 | B1 | 6/2001 | Cooper |
| 6,286,748 | B1 | 9/2001 | Cooper |
| 6,484,964 | B1 | 11/2002 | Cooper |
| 6,547,176 | B1 | 4/2003 | Blain et al. |
| 7,100,863 | B2 | 9/2006 | Hsu |
| 7,410,111 | B2 * | 8/2008 | Carroscia ............... B65H 57/18 206/408 |
| 2008/0156925 | A1 | 7/2008 | Cooper |
| 2010/0072317 | A1 | 3/2010 | Cooper |
| 2010/0276407 | A1 | 11/2010 | Cooper |
| 2013/0119184 | A1 | 5/2013 | Ma et al. |

FOREIGN PATENT DOCUMENTS

| | | |
|---|---|---|
| EP | 1712021 B1 | 11/2009 |
| FR | 2071007 A5 | 9/1971 |
| JP | 5530313 B2 | 3/1980 |
| JP | S61157567 U | 9/1986 |
| JP | 9315686 A | 12/1997 |
| JP | 2005053649 A | 3/2005 |
| JP | 2007238323 A | 9/2007 |
| JP | 2012016746 A | 1/2012 |
| KR | 100853530 B1 | 8/2008 |
| WO | 2005060397 A2 | 7/2005 |
| WO | WO2007149689 A2 | 12/2007 |
| WO | 2013074512 A1 | 5/2013 |

OTHER PUBLICATIONS

Machine Translation of DE 20 2011 108 769 U1, dated Mar. 15, 2012. (Year: 2012).*
International Search Report and Written Opinion dated Oct. 8, 2015 for PCT Application No. PCT/US2015/042910 filed Jul. 30, 2015.
Taiwan Intellectual Property Office Office Action with English translation for ROC (Taiwan) Patent Application No. 104125473, dated Nov. 1, 2017.
Taiwan Intellectual Property Office Office Action with English translation for ROC (Taiwan) Patent Application No. 104125473, dated Aug. 24, 2016.
Taiwan Intellectual Property Office Decision with English translation for ROC (Taiwan) Patent Application No. 104125473, dated Mar. 15, 2017.
European Patent Office Communication Pursuant to Article 94(3) EPC for Application No. 15748416.3, dated Oct. 10, 2017.
Japanese Office Action with English translation for Japanese Patent Application 2017-506686 dated Jan. 23, 2018.

* cited by examiner

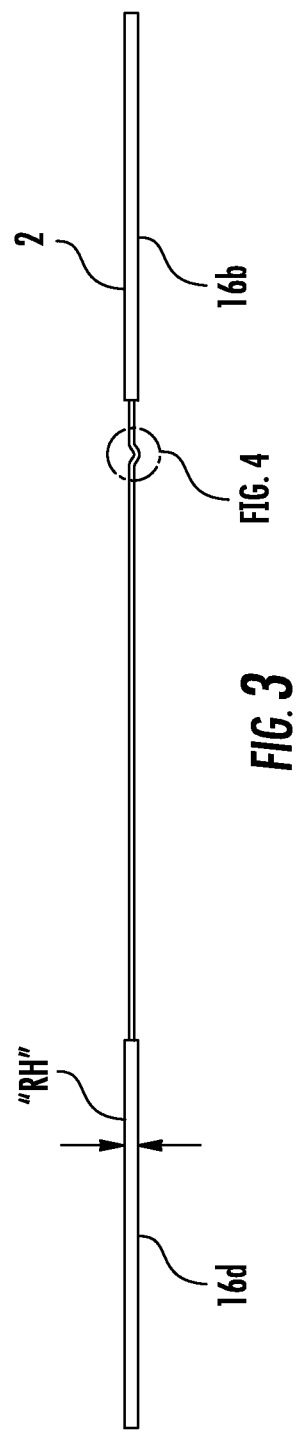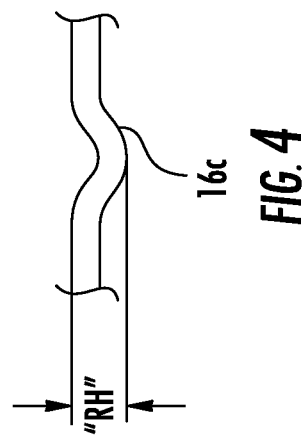

FLOATING FEED ASSIST UNIT FOR THE PAYOFF OF BULK PACKAGED WELDING WIRE

CROSS-REFERENCE TO RELATED APPLICATIONS

This is a non-provisional of provisional application Ser. No. 62/033,742, filed Aug. 6, 2014, the entirety of which application is incorporated by reference herein.

BACKGROUND OF THE DISCLOSURE

Field of the Disclosure

Embodiments of the invention generally relate to the dispensing of welding wire, and more particularly to a system and method for facilitating the dispensing of welding wire from a container.

Discussion of Related Art

There are unique dynamics that accompany the dispensing of welding wire from a bulk package such as a drum. The drums of wire require special payoff considerations in comparison to the contrasting method of using spools. For example, it may be important to maintain downward pressure on the wire while dispensing. This pressure should be light enough to ensure that it does not inhibit the feeding of the wire, which should be smooth and consistent. However, the downward pressure should be sufficient to ensure that the wire is held in place, creating a slight amount of tension in the feeding system.

The most significant issue in dispensing wire of this type is the problem of tangling of the wire during the payoff process. This problem is further increased with the use of a new product in the welding industry often referred to as "roller liner." Wire packaged in drums has an inherent twist in the wire, which is similar to the twist found in a garden hose that is coiled up on the ground. The "roller liner" limits the amount of twist that is allowed to pass through the welding system. This results in the twist being progressively forced back into the drum. Any excess or loose wire in the drum can become tangled in such a situation. This can be a problem for both 5xxx and 4xxx alloys.

There are currently several products that seek to assist in the feeding of drum packaged wire. The current versions include an orbital arm that mounts to the drum cover and is used in conjunction with a steel ring that floats on top of the wire stack. This arrangement holds the wire down, preventing it from lifting off the wire stack too quickly. Unfortunately, this did little to prevent the twisting associated with the "roller liner."

Another product that seeks to resolve this issue is a payoff unit that utilizes a similar rotating arm. This device floats on the wire stack and helps to keep the twist from forming in the drum. However, this method utilizes a smooth surface that rides on the wire stack. This design fails to provide a sufficient amount of friction on the wire.

The aforementioned shortcomings of the previous solutions warrant a new design. The orbital arm and the steel ring failed as a result of there being too much loose wire in the drum. The other payoff devices lack the appropriate amount of pressure and friction on the wire stack. This results in excessive amounts of wire being drawn from under that payoff unit. The excessive wire combined with the twisting resulting from the "roller liner" still causes tangling. Also, the rotating tube that is mounted on the device is only bent in one dimension. This bend fails to optimally feed the wire from the stack.

SUMMARY OF THE DISCLOSURE

A wire payoff system is disclosed for assisting in delivering welding wire packaged in bulk drums effectively and robustly. The disclosed system aids in the removal of wire from a drum, where the wire will be fed through a welding system. The purpose of the disclosed system is to provide a feed assisting accessory that will work effectively with both "hard" and "soft" aluminum alloys, although it is not limited to aluminum alloys and can be used with wires made from various materials. The disclosed system enables pay off of wire consistently and free of tangles.

A feed assist unit is disclosed, comprising a base portion having a plurality of ribs disposed on a lower surface thereof, the plurality of ribs extending from the lower surface. A dome portion can be connected to the base portion, and a rotating conduit portion can be rotatably coupled to the dome portion, the rotating conduit having a curved shape. Each of the plurality of ribs may have a first end disposed adjacent to the dome portion and a second end disposed adjacent to an associated side of the base portion.

Each of the plurality of ribs may be oriented perpendicular with respect to the associated side of the base portion. The feed assist unit may have first and second central axes "A-A," "B-B" oriented perpendicular to each other. The plurality of ribs may comprise first, second, third and fourth ribs, wherein the first and third ribs are oriented parallel to the second central axis and the second and fourth ribs are oriented parallel to the first central axis.

The first and third ribs can be offset from the second central axis by an offset length and the second and fourth ribs can be offset from the first central axis the offset length. The first ends of the first, second, third and fourth ribs may be positioned at about the 11 o-clock, 2 o-clock, 5 o-clock and 8 o-clock position, respectively, with respect to the dome portion.

A bearing can be disposed between the dome portion and the rotating conduit portion. The dome portion can have a height as measured from the base portion, the height being sufficient such that a first end of the rotating conduit portion does not extend past the base portion. The base portion can have a perimeter with a plurality of sides forming an octagonal shape. The ribs can be integrally formed with the base portion.

A method of dispensing welding wire from a container includes providing a feed assist unit on top of a wire stack disposed within a container, the feed assist unit comprising: a base portion having a plurality of ribs disposed on a lower surface thereof, the plurality of ribs extending from the lower surface, and a dome portion connected to the base portion, and feeding wire from the wire stack through an opening in the dome portion.

The method can further include directing the wire from the wire stack through a rotating conduit disposed in an opening in the dome portion, and directing the wire through the opening in the dome portion via the rotating conduit. The feed assist unit can further include a rotating conduit portion rotatably coupled to the dome portion via a bearing disposed in an opening in the dome portion, and wherein feeding wire from the wire stack comprises directing wire through the rotating conduit portion while the rotating conduit portion rotates with respect to the dome portion. The method can further include providing point contact between the plurality of ribs and top wires of the wire stack.

Each of the plurality of ribs can have a first end disposed adjacent to the dome portion and a second end disposed adjacent to an associated side of the base portion. The feed assist unit can have first and second central axes oriented perpendicular to each other, and wherein the plurality of ribs comprise first, second, third and fourth ribs, wherein the first and third ribs are oriented parallel to the second central axis and the second and fourth ribs are oriented parallel to the first central axis. The first and third ribs can be offset from the second central axis by an offset length and the second and fourth ribs are offset from the first central axis the offset length.

First ends of the first, second, third and fourth ribs can be positioned at about the 11 o-clock, 2 o-clock, 5 o-clock and 8 o-clock position, respectively, with respect to the dome portion. The dome portion can have a height as measured from the base portion, the height being sufficient such that a first end of the rotating conduit portion does not extend past the base portion.

BRIEF DESCRIPTION OF THE DRAWINGS

The accompanying drawings illustrate preferred embodiments of the disclosed method so far devised for the practical application of the principles thereof, and in which:

FIG. 3 is a side view of the feed assist unit of FIG. 1 without the dome portion;

FIG. 4 is a detail view of a portion of the side view of FIG. 3;

DESCRIPTION OF EMBODIMENTS

Figure 1:
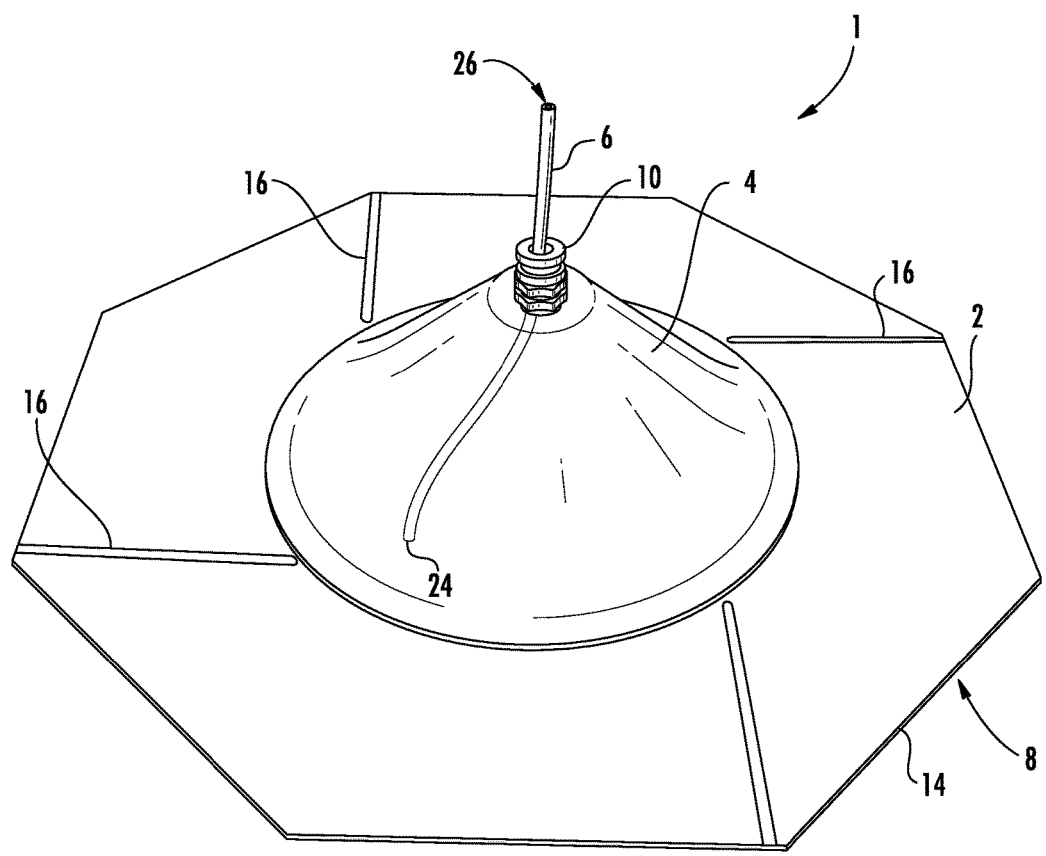
FIG. 1 is an isometric view of an embodiment of the disclosed feed assist unit.

The disclosed feed assist unit is configured to float on a wire stack, and includes a rotating conduit sleeve for guiding the unwinding wire out of its container. Ribs are provided on the underside of the feed assist unit to provide point contact on the wire of the stack, thus enabling the wire to be consistently pulled off the stack in small amounts, thereby preventing the unraveling of large sections of loose wire that could tangle.

The rotating section of conduit is formed in such a way as to lift the wire from the stack in a natural manner. In one embodiment the rotating conduit section is bent in two dimensions to best achieve this goal. The disclosed system ensures that the wire is still able to feed freely without a large amount of friction creating tension in the system.

Referring to FIGS. 1-6, the feed assist unit 1 comprises a base portion 2, a dome portion 4 and a rotatable conduit portion 6. The base portion 2 may be generally planar and may support the dome portion 4 which is centrally disposed therein. The base portion 2 may include an outer periphery 8 that is sized and shaped to fit within a welding wire container. The rotatable conduit portion 6 may be rotatably coupled to the dome portion 4 via a bearing 10 that is disposed in an opening 12 (FIG. 5) in the dome portion 4.

In the illustrated embodiment the base portion 2 is configured as an octagon, with a plurality of sides 14 each of which has a side length "L." In one non-limiting exemplary embodiment "L" is about 21.75 inches, though it will be appreciated that such shapes and dimensions are not critical, and that other shapes and sizes can be used without departing from the spirit of the disclosure. The dome portion 4 may have a height "H" sufficient that the rotatable conduit portion 6 does not extend past the base portion 2. In the illustrated embodiment the height "H" is about 5 inches. Again, it will be appreciated that this dimension is not critical and that other heights can be used.

The feed assist unit 1 can have first and second central axes "A-A," "B-B" oriented perpendicular to each other. In the illustrated embodiment each of the first and second central axes "A-A," "B-B" bisect the feed assist unit 1.

In use, the feed assist unit 1 sits on an upper surface of a wire stack so that the base portion 2 contacts the wire on the upper side of the wire stack. The dome portion 4 holds the rotating conduit portion 6 in place during operation. The weight of the feed assist unit 1 places downward pressure on the wire of the wire stack to ensure that the wire does not unreel or otherwise move prematurely.

The base portion 2 can have a plurality of ribs 16a-d disposed on a lower surface 18 thereof. The ribs 16a-d can provide point contact with the top wires of the wire stack to ensure that wire is fed off in a consistent fashion. This is an advantage because it ensures that the feed assist unit 1 contacts the wire even where the base portion 2 or the wire stack is not completely flat. The ribs 16 can be integrally molded with the base portion 2 or they can be provided as separate members and adhered or otherwise attached to the base portion 2. In addition, the ribs 16 can be the same material as that of the base portion 2, or they can be formed from a different material. As can best be seen in FIGS. 3 and 5, the ribs 16 have a rib height "RH," extending away from the bottom surface 18 of the base portion 2. In one non-limiting exemplary embodiment, the rib height "RH" is about 0.125-inches. It will be appreciated this dimension is not critical and other rib sizes can be used. The ribs 16 can each have a rib length "RL," (FIG. 2) which in one non-limiting exemplary embodiment is about 6 inches.

Figure 2:
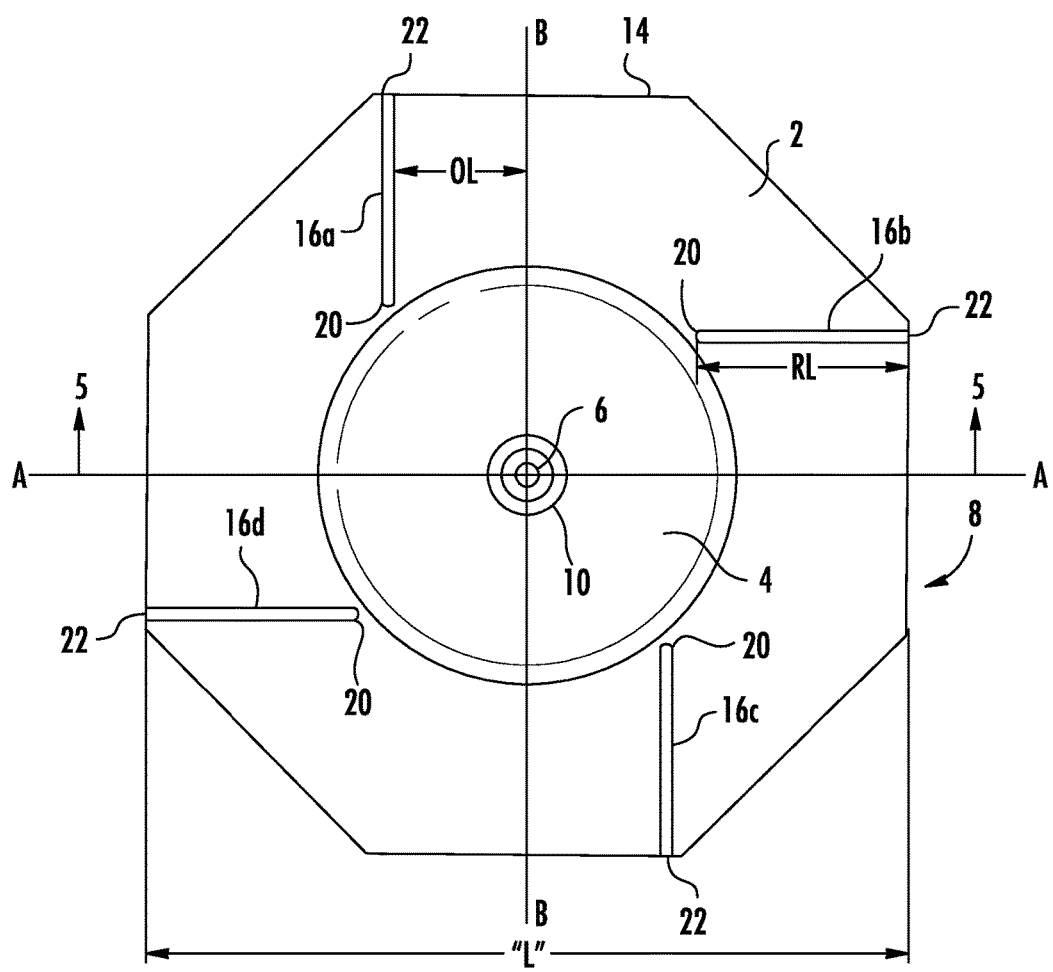
FIG. 2 is a plan view of the feed assist unit of FIG. 1.
Figure 5:
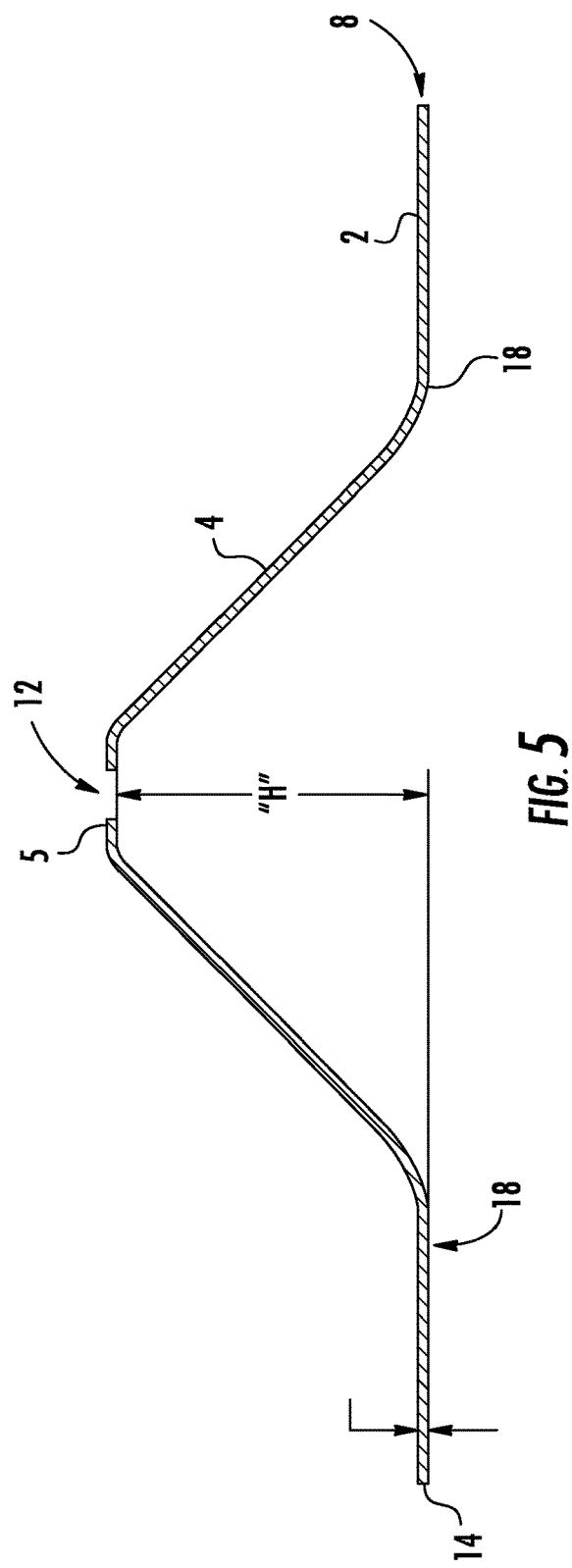
FIG. 5 is a cross-section view, taken alone line 5-5 of FIG. 2.
Figure 6:
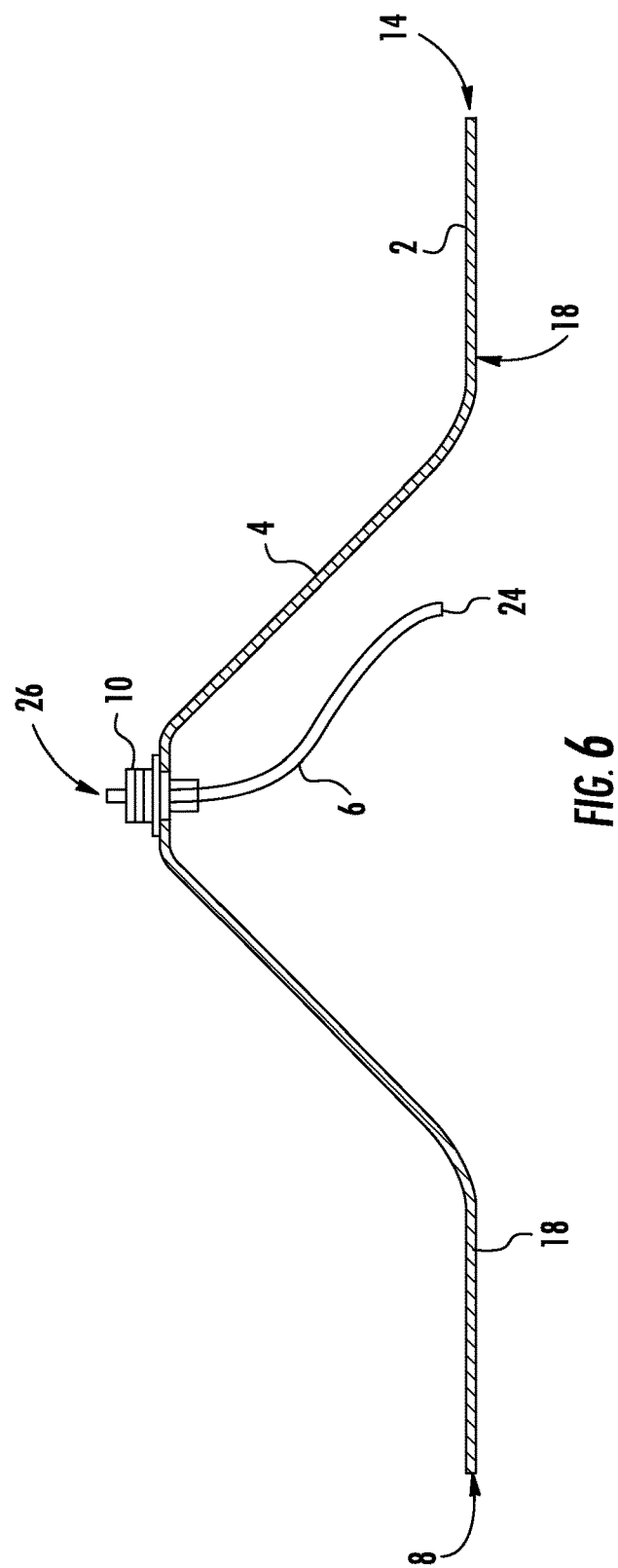
FIG. 6 is a cross-section view, taken alone line 5-5 of FIG. 2, with an exemplary conduit section attached.

As can be seen best in FIG. 2, four ribs 16a-d are provided, with each rib oriented perpendicular to the next adjacent ribs. In the illustrated embodiment the ribs 16a-d have a first end 20 disposed adjacent to the dome portion and a second end 22 disposed adjacent to an associated side 14 of the base portion 2. The ribs 16 can be oriented perpendicular to the associated side 14 of the base portion 2. As can be seen, first and third ribs 16a, 16c are oriented parallel to the second central axis "B-B," while second and fourth ribs 16b, 16d are oriented parallel to the first central axis "A-A." The first and third ribs 16a, 16c are also offset from the second central axis "B-B" by an offset length "OL," while the second and fourth ribs 16b, 16d are offset from the first central axis "A-A" by the same offset length "OL." Thus arranged, the first ends 20 of the first, second, third and fourth ribs are positioned at about the 11 o-clock, 2 o-clock, 5 o-clock and 8 o-clock position, respectively, with respect to the dome portion 4. Other positionings of the ribs 16a-d are also contemplated.

As previously noted, the dome portion 4 retains the rotating conduit portion 6 via bearing 10 disposed in an opening 12 (FIG. 5) in the dome portion. The rotating conduit portion 6 functions to ensure that as soon as the wire is pulled from the wire stack that it doesn't simply come loose, which could otherwise cause tangling. By maintaining the wire either under the base portion 2 or within the rotating conduit portion 6, there is very limited chance for tangling. In one embodiment the bearing 10 has an outer surface fixed to the dome portion 4 (see, e.g., FIG. 5) and an inner portion fixed to the rotating conduit portion 6 to provide free rotation therebetween.

Figure 7:
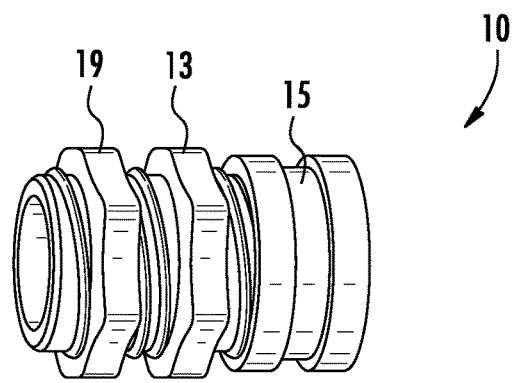
FIG. 7 is a view of a portion of an exemplary bearing of the feed assist unit of FIG. 1.
Figure 8:
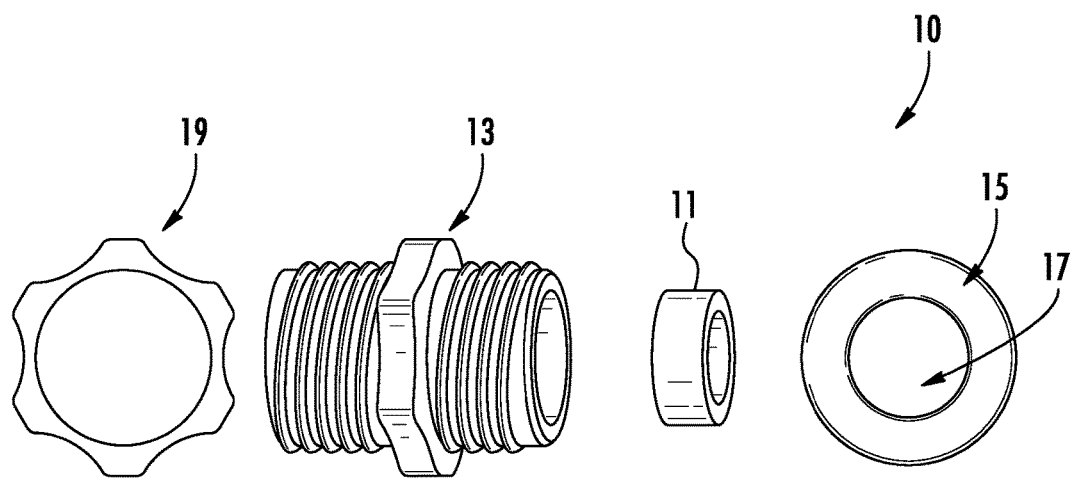
FIG. 8 is an exploded view of the bearing of FIG. 7.

FIGS. 7 and 8 show an exemplary embodiment of the bearing 10, including a roller bearing 11 having an outer ring disposed within a threaded fitting 13. A threaded cap 15 can be threadably engaged with a first end of the threaded fitting to fix the roller bearing 11 within the threaded fitting 13. The threaded cap 15 can include an opening 17 through which the rotating conduit portion 6 may be disposed. A nut 19 can be threadably engaged with a second end of the threaded fitting 13. The nut 19 and threaded fitting 13 can sandwich a horizontal surface 5 (see FIG. 5) of the dome portion 4 therebetween to fix the bearing 10 to the dome portion 4. An inner ring of the roller bearing 11 can be fixed to the rotating conduit portion 6. Providing a freely rotating bearing 10 can be important since any additional drag in the feeding system can cause other unrelated problems.

Figure 9:
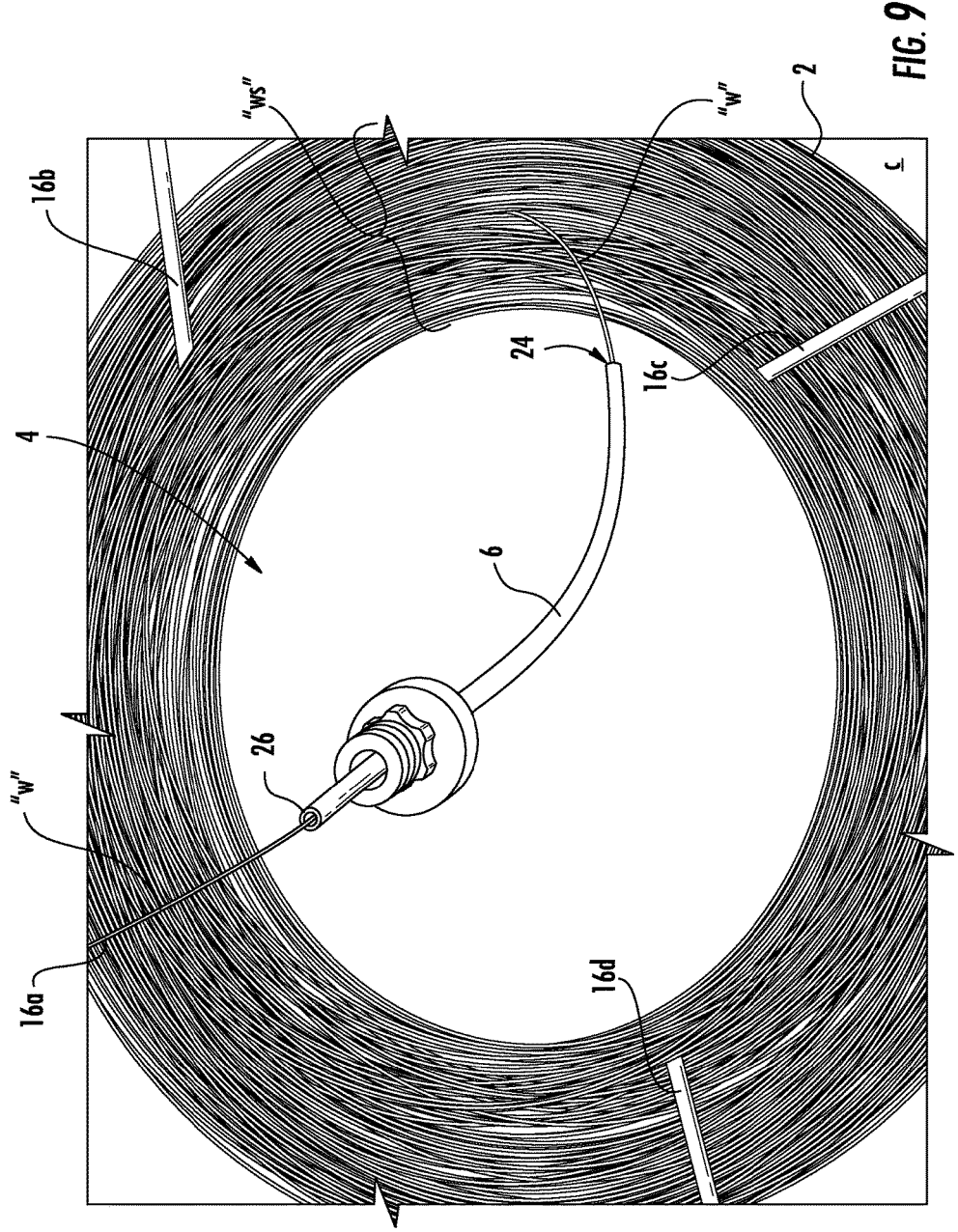
FIG. 9 is an isometric view of the feed assist unit of FIG. 1 disposed in an exemplary wire container.
Figure 10:
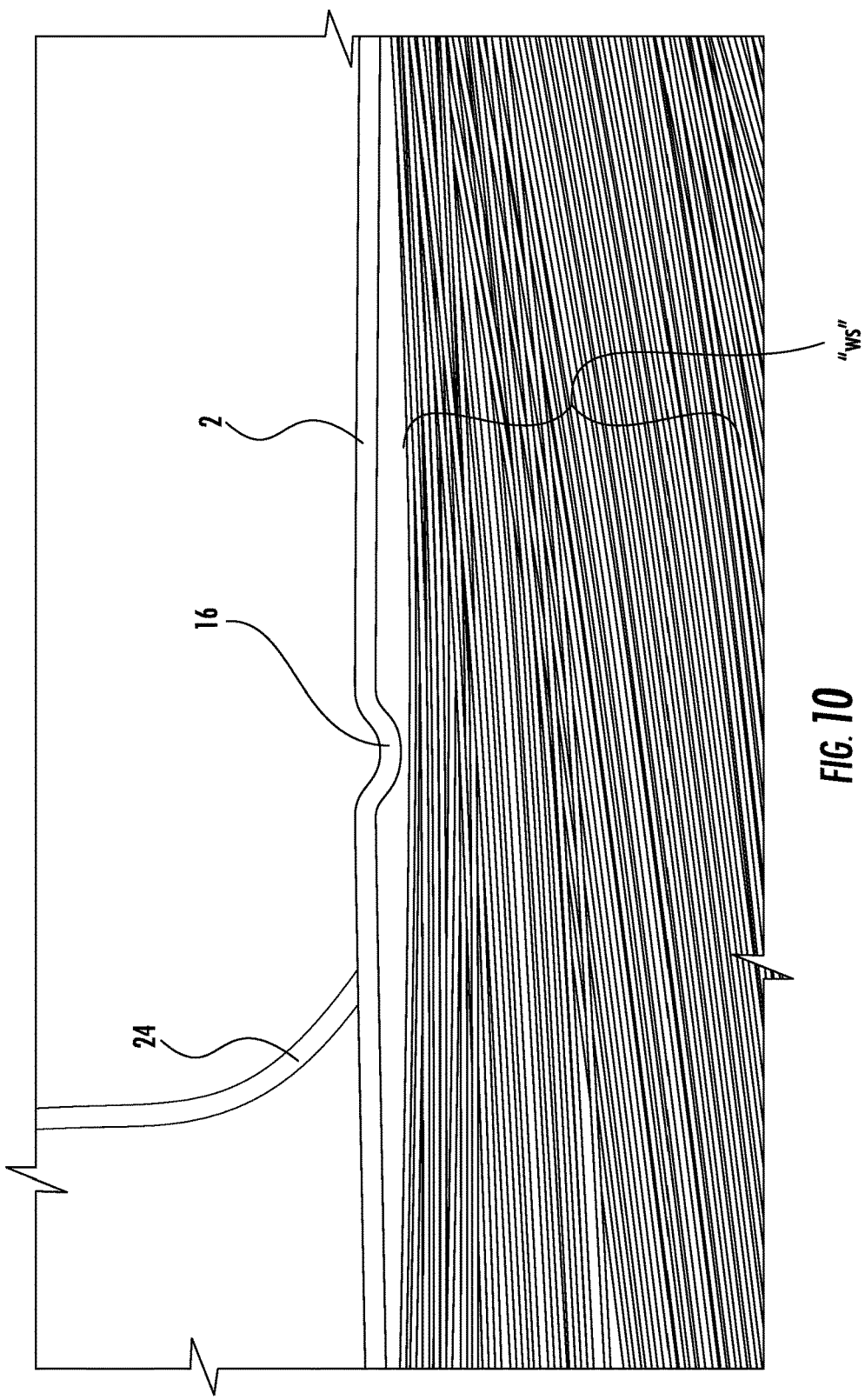
FIG. 10 is a side view of the feed assist unit of FIG. 1 disposed in the exemplary wire container of FIG. 9.

The rotating conduit portion 6 may have a first end 24 disposed within the dome portion 4 and a second end 26 disposed above the dome portion 4. As can be seen in FIGS. 9 and 10, the first end 24 may be positioned adjacent to the wire stack "WS" to admit wire "W" from the stack into the rotating conduit portion 6. The second end 26 of the rotating conduit portion 6 may be oriented substantially vertically (i.e., perpendicular to the first and second central axes (A-A, B-B) to enable the wire "W" to be routed out of the wire container.

As can be seen in FIG. 9, the rotating feed unit 1 fits within an exemplary container "C" so that the base portion 2 sits atop the wire stack "WS." FIG. 10 shows the positioning of one of the ribs 16 atop the wire stack "WS" providing the aforementioned point contact with the individual wires of the stack.

In one embodiment the rotating conduit portion 6 is a hollow tubular member made of nylon, with an outside diameter of 0.25 inches and an inside diameter of 0.125 inches. It will be appreciated that other materials and tube sizes can also be used as desired.

As can be seen, the rotating conduit portion 6 can have a gentle multidimensional curvature configured to enable to the rotating conduit portion to pick up the wire off the stack. By providing the rotating conduit portion 6 with such a curvature allows for smooth friction-reduced feeding once the wire is lifted from the stack.

The illustrated feed assist unit 1 can be made from a clear polymer material. It will be appreciated, however, that the material used to form the feed assist unit is not essential to its operation. In addition, the base portion 2 and dome portion 4 can be molded or otherwise formed as an integral piece. Alternatively, they can be formed as separate pieces that are adhered or otherwise fixed together.

In addition, the disclosed feed assist unit 1 can be used with any of a variety of wire types, a non-limiting exemplary list of which includes aluminum, copper, stainless steel, silicon-bronze and steel.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A feed assist unit, comprising:
   a base portion having a plurality of ribs disposed on a lower surface thereof, the plurality of ribs extending from the lower surface, wherein the base portion includes at least one depression located on an upper surface of the base portion, wherein the at least one depression corresponds to and is disposed at a location opposite to one of the plurality of ribs,
   a dome portion connected to the base portion, and
   a rotating conduit portion rotatably coupled to the dome portion, the rotating conduit having a curved shape.

2. The feed assist unit of claim 1, wherein each of the plurality of ribs has a first end disposed adjacent to the dome portion and a second end disposed adjacent to an associated side of the base portion.

3. The feed assist unit of claim 1, wherein each of the plurality of ribs is oriented perpendicular with respect to an associated side of the base portion.

4. The feed assist unit of claim 1, wherein the feed assist unit has first and second central axes oriented perpendicular to each other.

5. The feed assist unit of claim 4, wherein the plurality of ribs comprise first, second, third and fourth ribs, wherein the first and third ribs are oriented parallel to the second central axis and the second and fourth ribs are oriented parallel to the first central axis.

6. The feed assist unit of claim 5, wherein the first and third ribs are offset from the second central axis by a first offset length and the second and fourth ribs are offset from the first central axis by a second offset length.

7. The feed assist unit of claim 5, wherein first ends of the first, second, third and fourth ribs are positioned at about the 11 o-clock, 2 o-clock, 5 o-clock and 8 o-clock positions, respectively, with respect to the dome portion.

8. The feed assist unit of claim 1, further comprising a bearing disposed between the dome portion and the rotating conduit portion.

9. The feed assist unit of claim 1, wherein the dome portion has a height as measured from the base portion, the height being sufficient such that a first end of the rotating conduit portion does not extend past the base portion.

10. The feed assist unit of claim 1, wherein the base portion has a perimeter with a plurality of sides forming an octagonal shape.

11. The feed assist unit of claim 1, wherein the ribs are integrally formed with the base portion.

12. A method of dispensing welding wire from a container, comprising:
   providing a feed assist unit on top of a wire stack disposed within a container, the feed assist unit comprising:
      a base portion having a plurality of ribs disposed on a lower surface thereof, the plurality of ribs extending from the lower surface, wherein the base portion includes at least one depression located on an upper surface of the base portion, wherein the at least one depression corresponds to and is disposed at a location opposite to one of the plurality of ribs, and
      a dome portion connected to the base portion, and
   feeding wire from the wire stack through an opening in the dome portion.

13. The method of claim 12, further comprising directing the wire from the wire stack through a rotating conduit disposed in the opening in the dome portion, and directing the wire through the opening in the dome portion via the rotating conduit.

14. The method of claim 12, wherein the feed assist unit further comprises a rotating conduit portion rotatably coupled to the dome portion via a bearing disposed in the opening in the dome portion, and wherein feeding the wire from the wire stack comprises directing the wire through the rotating conduit portion while the rotating conduit portion rotates with respect to the dome portion.

15. The method of claim 12, further comprising providing point contact between the plurality of ribs and top wires of the wire stack.

16. The method of claim 12, wherein each of the plurality of ribs has a first end disposed adjacent to the dome portion and a second end disposed adjacent to an associated side of the base portion.

17. The method of claim 16, wherein the feed assist unit has first and second central axes oriented perpendicular to each other, and wherein the plurality of ribs comprise first, second, third and fourth ribs, wherein the first and third ribs are oriented parallel to the second central axis and the second and fourth ribs are oriented parallel to the first central axis.

18. The method of claim 17, wherein the first and third ribs are offset from the second central axis by a first offset length and the second and fourth ribs are offset from the first central axis by a second offset length.

19. The method of claim 18, wherein first ends of the first, second, third and fourth ribs are positioned at about the 11 o-clock, 2 o-clock, 5 o-clock and 8 o-clock positions, respectively, with respect to the dome portion.

20. The method of claim 12, wherein the dome portion has a height as measured from the base portion, the height being sufficient such that a first end of the rotating conduit portion does not extend past the base portion.

\* \* \* \* \*